(12) United States Patent
Bilz

(10) Patent No.: US 6,315,671 B1
(45) Date of Patent: Nov. 13, 2001

(54) SIDE SHAFT JOURNAL FOR A DIFFERENTIAL GEAR WITH ADJUSTED JOINT COMPONENT OF A UNIVERSAL-JOINT DRIVE SHAFT

(75) Inventor: Peter Bilz, Freigericht (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 09/367,165
(22) PCT Filed: Jan. 24, 1998
(86) PCT No.: PCT/EP98/00396
  § 371 Date: Dec. 7, 1999
  § 102(e) Date: Dec. 7, 1999
(87) PCT Pub. No.: WO98/35174
  PCT Pub. Date: Aug. 13, 1998

(30) Foreign Application Priority Data

Feb. 7, 1997 (DE) .............................................. 197 04 729

(51) Int. Cl.$^7$ ....................................................... F16C 3/00
(52) U.S. Cl. ............................................ 464/182; 403/359.1
(58) Field of Search ................................... 464/182, 183; 475/222, 230; 138/109; 285/332.4; 403/315, 316, 317, 320, 359.1, 359.6

(56) References Cited

U.S. PATENT DOCUMENTS

| | | | |
|---|---|---|---|
| 1,476,329 | * 12/1923 | Duesenberg | 475/230 X |
| 2,587,838 | * 3/1952 | Green | 403/359.1 |
| 3,126,723 | * 3/1964 | Dugay | 464/33 |
| 3,991,629 | * 11/1976 | Dearnley | 464/183 X |
| 4,124,318 | * 11/1978 | Sagady | 403/359.5 X |
| 4,893,658 | * 1/1990 | Kimura et al. | 138/109 |
| 5,667,331 | * 9/1997 | Lindenthal | 403/359.5 |

FOREIGN PATENT DOCUMENTS

626779 * 7/1949 (GB) .................................... 464/182

* cited by examiner

*Primary Examiner*—Lynne H. Browne
*Assistant Examiner*—Greg Binda

(57) ABSTRACT

The invention relates to an assembly comprising a side shaft journal and a joint component of a CV-jointed shaft, and a method of making the same. The assembly provides a side shaft journal (31) for a differential gear, comprising an inner end which can be inserted into the differential gear, said inner end having an outer toothing (33) and a ring groove (23) for receiving a locking ring (24) by means of which the inner end can be removably connected to a side shaft wheel (25) of the differential gear. Said side shaft journal also comprises an outer end which can be connected to a joint component (41) of a universal-joint drive shaft, said outer end having a toothing (32) and formed elements (33, 34, 40) for receiving axial securing elements, which can be non-destructively removed, for the joint component. The shaft journal (31) is configured as a hollow shaft.

23 Claims, 5 Drawing Sheets

US 6,315,671 B1

SIDE SHAFT JOURNAL FOR A DIFFERENTIAL GEAR WITH ADJUSTED JOINT COMPONENT OF A UNIVERSAL-JOINT DRIVE SHAFT

BACKGROUND OF THE INVENTION

The invention relates to an assembly consisting of a side shaft journal for a differential drive and of a joint component of a CV-jointed shaft, which joint component is connected to the side shaft journal. The invention also relates to a unit consisting of a differential drive and two side shafts with at least one such assembly consisting of a side shaft journal and a joint component.

Prior art side shaft journals of differential drives of a first type comprise an outer flange for bolting on a joint component of an adjoining CV-jointed shaft. The disadvantage of such shaft journals is that the joint component has to be adapted accordingly, i.e. it must be designed to receive bolting connecting means which, as a rule, are plugged-through bolts. To be able to receive the threaded holes, the joint component needs to have additional material away from the functional parts, as a result of which the joint component becomes heavier and more expensive to produce.

Furthermore, there are prior art side shaft journals of a second type wherein—in order to avoid the above-mentioned disadvantages—the shaft journal is integral with the joint component of the adjoining CV-jointed shaft. Assembling constant velocity joints is a complex operation which cannot be undertaken when the shaft journal has already been inserted into the differential drive. The resulting disadvantage is that it is only during the mounting of the CV-jointed shafts at the vehicle, that the differential drive can be sealed outwardly by inserting the shaft journal and that it is only after completion of this operation that the differential drive can be filled with lubricant. This is highly disadvantageous for the production sequences of the vehicle.

Furthermore, there are prior art side shafts whose outer end is provided with shaft toothing which is used in a plug-in connection for the joint component of the adjoining CV-jointed shaft. As a rule, such shaft journals are directly axially secured relative to the drive housing of the differential drive.

SUMMARY OF THE INVENTION

It is the object of the present invention to provide an assembly of the above-mentioned type with a side shaft journal which comprises improved attaching and axial securing means, which is lighter in weight and easier to produce.

The objective is achieved by the combination of characteristics in accordance with the invention:

an assembly consisting of a side shaft journal for a differential drive and of a joint component of a CV-jointed shaft which joint component is connected to the shaft journal, with the shaft journal comprising an inner end insertable into the differential drive and having outer shaft toothing and an annular groove for receiving a securing ring, by means of which annular groove the inner end is releasably connectable to a side shaft gear of the differential drive, and further comprising an outer end which is connectable to the joint component and provided with shaft toothing and formations for receiving nondestructively releasable axial securing means for the joint component, with the shaft journal being provided in the form of a hollow shaft.

By providing the inventive embodiment with a side shaft journal in the form of a hollow shaft, it is possible to achieve a considerable reduction in weight as compared to prior art shaft journals which, at most, are partially hollow. The transition to the shaft toothings as connecting means at both ends, i.e. for providing a connection with the side shaft gear and with the joint component, leads to a further substantial reduction in weight as compared to prior art flange shaft journals. By using a retaining ring connection for axial securing purposes relative to the side shaft gear, it is possible to achieve a simple and secure assembly which turns the differential drive with the inserted shaft journal into a sealed system which is fully filled with lubricant and which, in a fully functioning condition, can be mounted on the vehicle. By designing the interface relative to the joint component as a releasable plug-in connection, it is also possible, subsequently, in the course of the production of the vehicle and for repair purposes at a later stage, to mount the CV-jointed shafts supplied in a fully functioning condition and filled with lubricant.

The axial securing means between the outer end of the shaft journal and the joint component are designed in such a way that the connection can be released without the retaining ring connection between the shaft journal and the side shaft gear being subjected to axial forces. In this way, any unintentional removal of the shaft journal, which would destroy the sealed differential drive system, is rendered impossible.

By providing the inventive shaft journal in the form of a hollow shaft, it is possible-to produce the shaft journal by a non-chip-producing forming process which is a low-energy process. Such processes wherein the shaft toothing can also be finished by a non-chip producing forming method are round hammering or round kneading or certain stretching methods, starting from the raw material. The open inner end of an assembly produced in this way has to be closed by a cover, so that the differential is sealed as required. In addition, provided the length/diameter ratio is not too extreme, the inventive shaft journal can be produced by deep drawing, in which case, in a particularly advantageous way, the base of the product already provides the means for internally sealing the differential.

As far as the design of the shaft toothing at the outer end is concerned, i.e. the connection with the joint component, it is possible to provide either outer shaft toothing which is inserted into an overlapping sleeve portion of the joint component, or inner shaft toothing which is overlappingly slid on to a journal or cylindrical portion of the joint component. The respective joint component can be provided with a base which seals the joint at one end and which is followed by a sleeve for providing a plug-in connection substantially improves the overall system of the differential drive with the adjoining CV-jointed shafts.

As regards releasable connecting means between the outer end of the shaft journal and the joint component, a few advantageous examples will be listed below:

One possibility consists in producing a retaining ring connection with suitable annular grooves in the region of the shaft toothing, which grooves jointly receive a retaining ring.

A further embodiment consists in providing a wedged annular groove in the inner part of the plug-in connecting means into which groove there are threaded conically tapered pins from the outside through the outer part of the plug-in connecting means, which pins rest against the flanks of the keyway. If the pins rest against only one of the flanks, the parts of the plug-in connecting means can be clamped relative to one another due to the respective end faces mutually resting against one another.

A further embodiment may comprise a union nut which is axially supported on the slid-in part of the plug-in connecting means via a securing ring and which extends over the slid-on part of the plug-in connecting means and is secured thereto by means of a thread. Again, axial clamping can be effected by opposed end faces contacting one another between the parts connected to one another by the plug-in connecting means.

If the shaft journal is slid into a sleeve portion of the joint component, it is proposed according to a particularly advantageous embodiment to provide a bore in said sleeve, which bore leads to the axial abutment faces between the parts. A wedge-shaped tool can then be passed through the bore or aperture for driving the connection apart, if necessary, without any axial forces being transferred to the retaining ring connection between the shaft journal and the side shaft gear.

When the outer open end of the shaft journal extends over an attaching element of the joint component, the axial abutment region is usually positioned outside the differential drive and is freely accessible, so that a wedge-shaped tool can easily be applied.

In the case of the above-mentioned inventive production methods for the shaft journal, forming takes place in such a way that the wall thickness substantially remains the same. In particular, for weight optimizing purposes in the case of a stepped shaft journal, it is proposed that a constant resistance moment is set along the length by means of the all thickness/diameter ratios. A further aspect is that the degree of forming should be as low as possible so that cold-forming is also possible. For this purpose, it could be advantageous to widen the outer end of the shaft journal, whereas the outer diameter of the inner shaft end is optionally reduced in connection with producing the outer shaft toothing.

The invention provides a functionally advantageous component which is cheap to produce and which substantially improves the overall system of the differential drive with the adjoining CV-jointed shafts.

To the extent that this has not yet been explained above, special reference is made to preferred embodiments listed in the sub-claims. All preferred embodiments may be used alone or in any possible combination thereof.

BRIEF DESCRIPTION OF THE DRAWINGS

Preferred embodiments will be described below with reference to the drawing wherein.

DETAILED OF THE INVENTION

Figure 1:
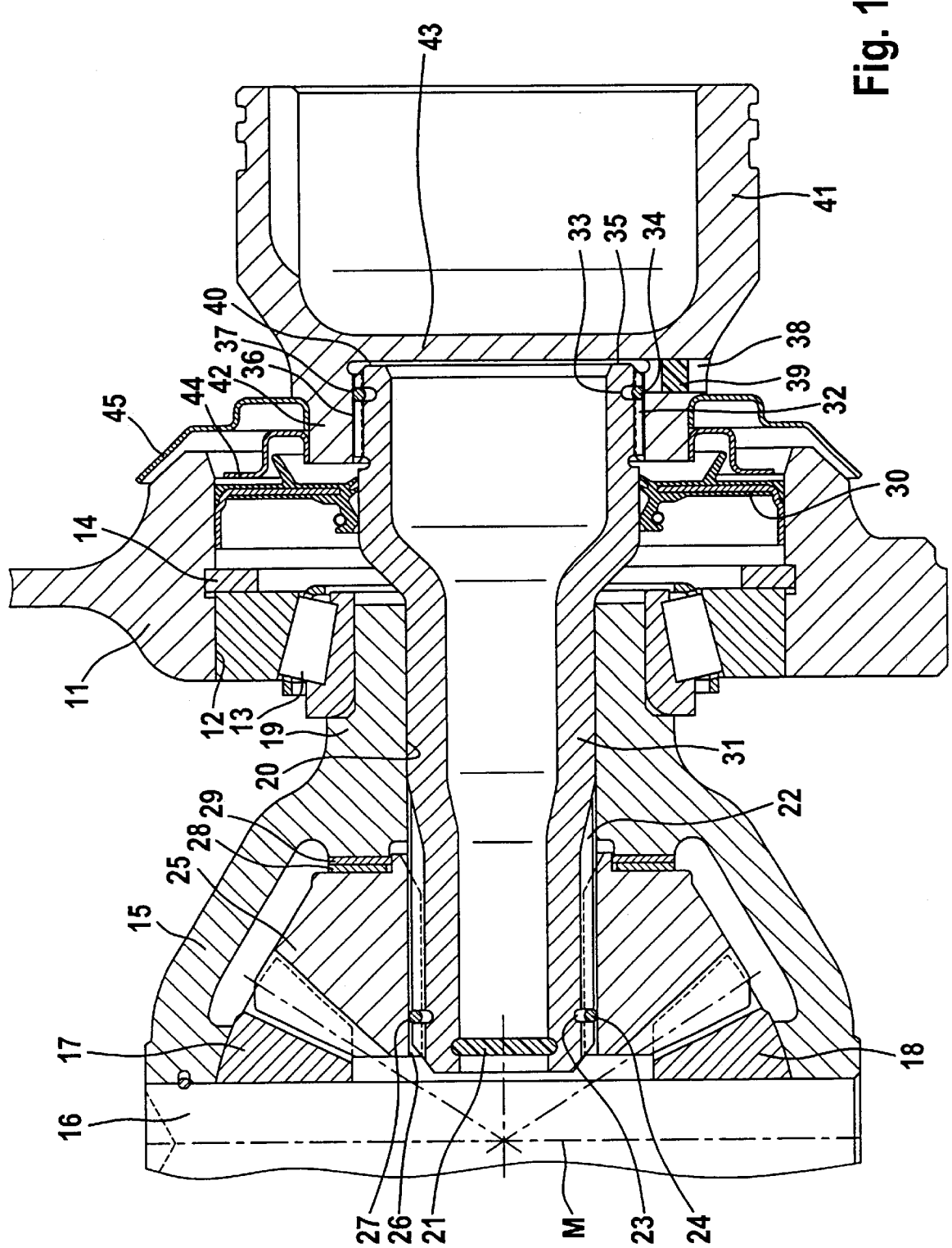
FIG. 1 shows half a section through a differential drive with a plugged-in inventive journal and a slipped-on inventive outer joint part in a first embodiment.

To the extent that the details in FIGS. 1 to 5 are identical, they have been given the same reference numbers and will be described jointly.

A differential drive is shown in the region where a shaft passes through part of the drive housing 11 with a shaft passage aperture 12. An angular roller bearing 13 is inserted into the through-aperture 12 and secured axially outwardly by a securing ring 14. A differential carrier 15 positioned inside the housing 11 is supported in the angular roller bearing 13. The differential carrier 15 is shown only slightly beyond its central plane M. In the central plane there is inserted a radial bearing journal 16 which supports two differential bevel gears 17, 18. As can be seen, the differential carrier 15 is provided with a sleeve projection 19 which forms a plug-in aperture 20 for a side shaft journal which is referred to separately in the individual drawings. The side shaft journal is supported on a friction bearing in the plug-in aperture 20. The inner end of the side shaft journal is closed by a cover 21. At its inner end extending into the differential carrier 15, the side shaft journal comprises outer shaft toothing 22 and an annular groove 23 holding a retaining ring 24. On said inner ring, there is positioned one of two side shaft bevel gears 25 provided with corresponding inner shaft toothing 26 in which there is formed an annular groove 27. The side shaft bevel gear 25 is supported relative to the differential carrier 15 by two sliding plates 28, 29. The outer end of the side shaft journal which emerges from the differential housing 11 is sealed relative thereto by a composite seal 30 positioned in the through-aperture 12. The outer free end of the side shaft journal is connected to the outer joint part (referred to separately in the individual drawings) by means of plug-in connecting means. The assembly of the side shaft bevel gear 25 with the side shaft journal has to be assumed to be duplicated in a symmetric arrangement in the differential carrier 15. The driving means for rotatingly driving the differential carrier 15 inside the differential housing 11 are to be assumed to be provided on the outside of the second half of the differential carrier (not shown).

In FIG. 1, the side shaft journal 31 is provided in the form of a hollow shaft which, in two steps, changes from a portion with a larger diameter positioned outside the housing 11 to the portion with the smaller diameter inserted into the side shaft bevel gear 25. At the outer end, there is provided an outer shaft toothing 32 provided with an annular groove 33 which is engaged by a retaining ring 34. On to the outer end, there is slid the outer joint part 41 by means of a cylindrical projection 42 which is provided with inner shaft toothing 36 which also comprises an annular groove 37. The latter is also engaged by the retaining ring 34 and thus axially secures the outer joint part 41 relative to the side shaft journal 31 in both directions.

The cylindrical projection 42 is provided with a radial bore 38 which is closed by a plug 39 made of plastics. After the plug 39 has been removed, a wedge-shaped tool can be inserted into the annular gap 40 between the base part 43 of the outer joint part 41 and an end face 35 of the side shaft journal 31. In this way, the retaining ring connection can be released without any axial forces being applied to the retaining ring connection between the side shaft journal 31 and the side shaft bevel gear 25. On the outside of the cylindrical projection 42, there are provided two protective covers 44, 45 for protecting the composite seal 30.

Figure 2:
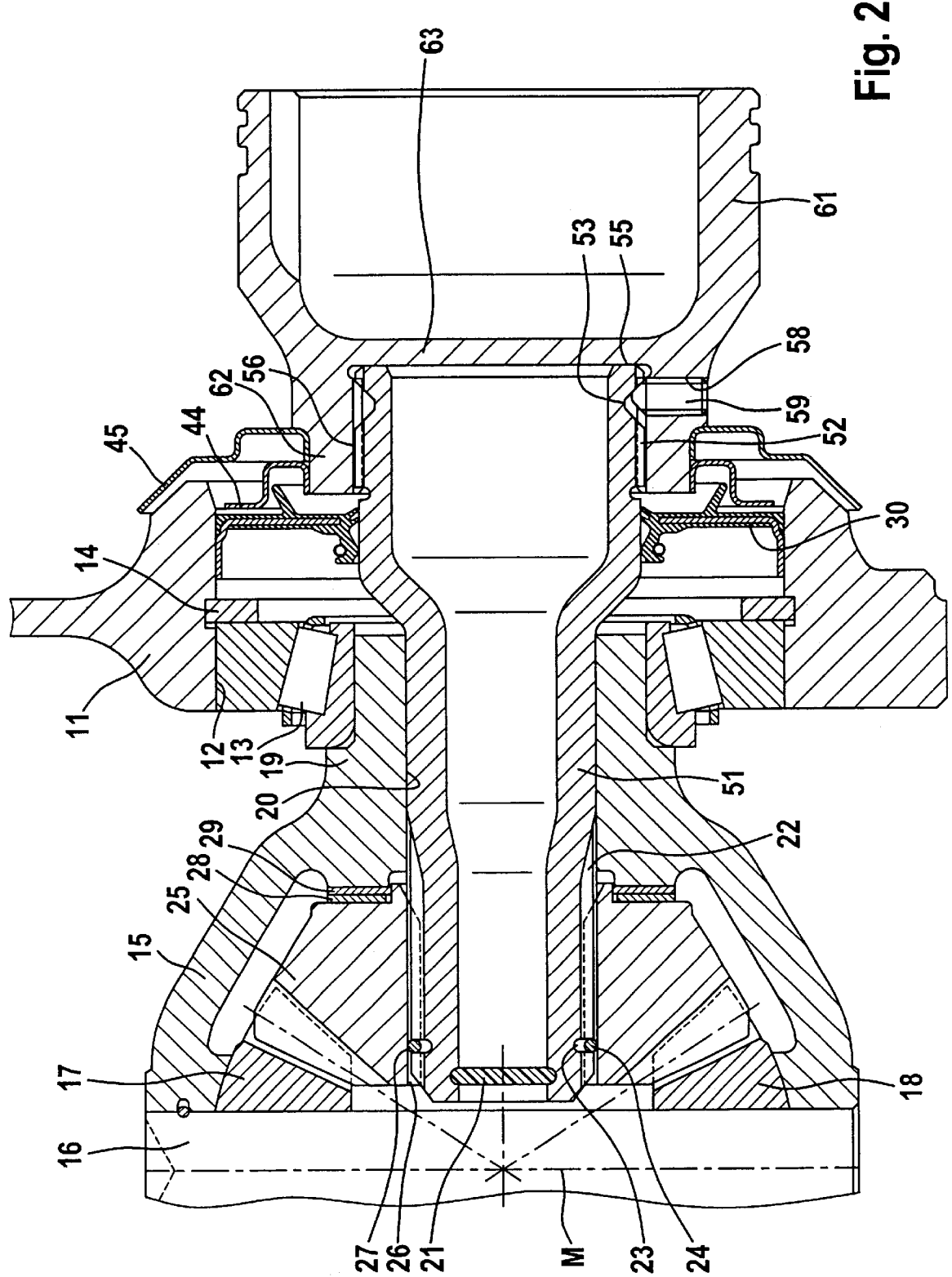
FIG. 2 shows half a section through a differential drive with a plugged-in inventive journal and a slipped-on inventive outer joint part in a second embodiment.

In FIG. 2, the side shaft journal 51 is provided in the form of a hollow shaft which, in two steps, changes from a portion with a larger diameter positioned outside the housing to a portion with a smaller diameter inserted into the side shaft bevel gear 25. At the outer end, there is provided an outer shaft toothing 52 which comprises a keyway 53. On to the outer end, there is slid the outer joint part 61 by means of a cylindrical projection 62 which comprises an inner shaft toothing 56.

The cylindrical projection 62 is provided with a radial bore 58 into which there is threaded a conical bolt 59, On the circumference, there are provided three bores with three bolts which engage the keyway 53 in the flank located towards the end and thus secure the outer joint part 61 relative to the side shaft journal 51, with an end face 55 of the side shaft journal being in abutment with the base part 63 of the outer joint part 61. The keyway connection can be released without any axial forces being applied to the retaining ring connection between the side shaft journal 51 and the side shaft bevel gear 25. On the outside of the cylindrical projection 62 there are provided two protective covers 44, 45 for protecting the composite seal 30.

Figure 3:
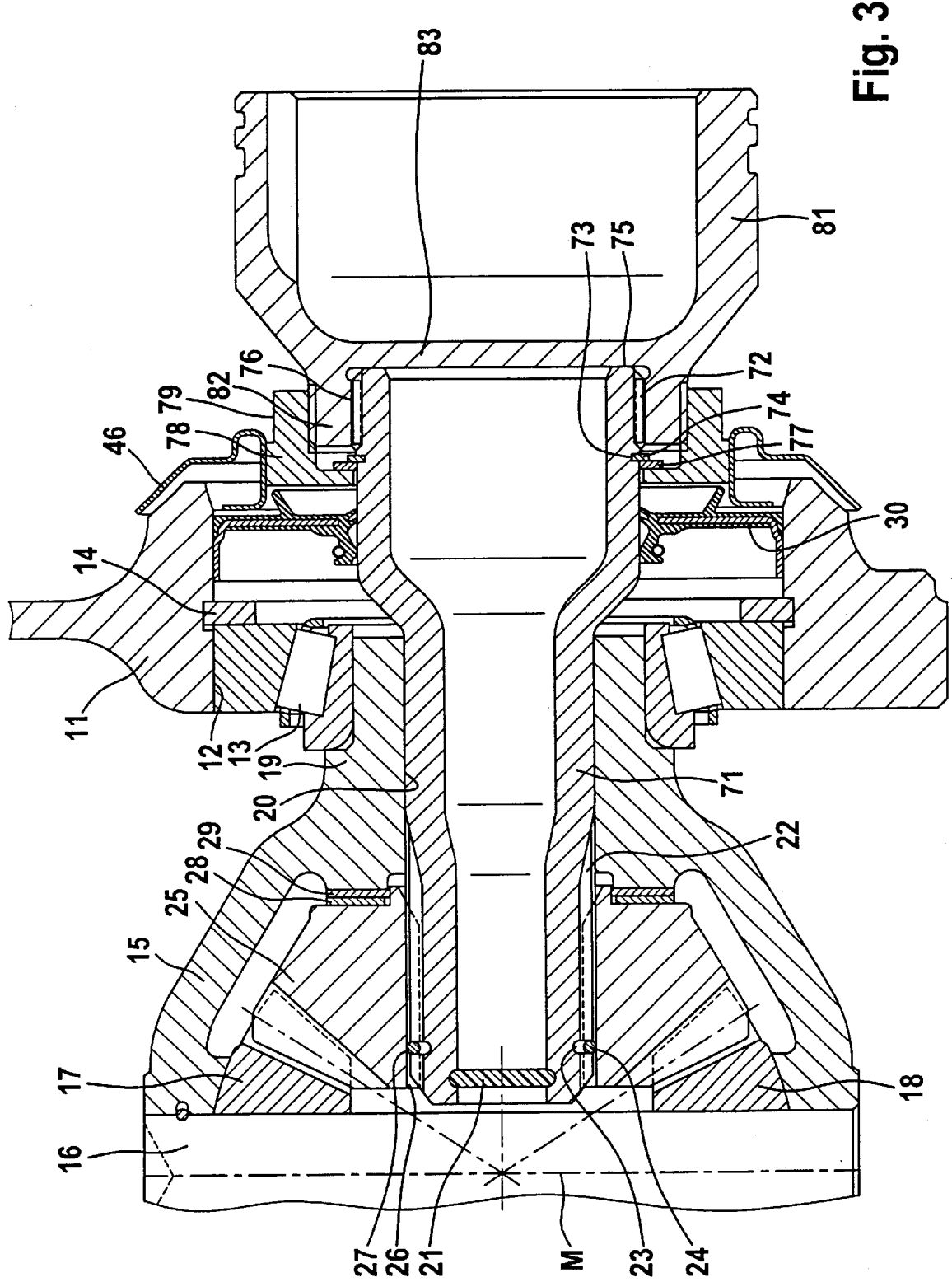
FIG. 3 shows half a section through a differential drive with a plugged-in inventive journal and a slipped-on inventive outer joint part in a third embodiment.

In FIG. 3, the side shaft journal 71 is provide in the form of a hollow shaft which, in two steps, changes from a portion with a larger diameter positioned outside the housing 11 to the portion with the smaller diameter inserted into the side shaft bevel gear 25. At the outer end, there is provided an outer shaft toothing in front of which there is provided an annular groove 73 which is engaged by a securing ring 74. On to the outer end, there is slid an outer joint part 81 means of a cylindrical projection 82 which comprises an inner shaft toothing 76. The securing ring 74 holds a disc 77 which supports a union nut 78 which, on its outside, comprises key faces 79. Said union nut 78 extends over the cylindrical projection 82 and is threaded thereto. The end face 75 of the side shaft journal 71 is in abutment with the base part 83 of the outer joint part. The union nut connection can be released without any axial forces being applied to the retaining ring connection between the side shaft journal 71 and the side shaft bevel gear 25. On the outside of the union nut 78, there is positioned a protective cover 46 for protecting the composite seal 30.

Figure 4:
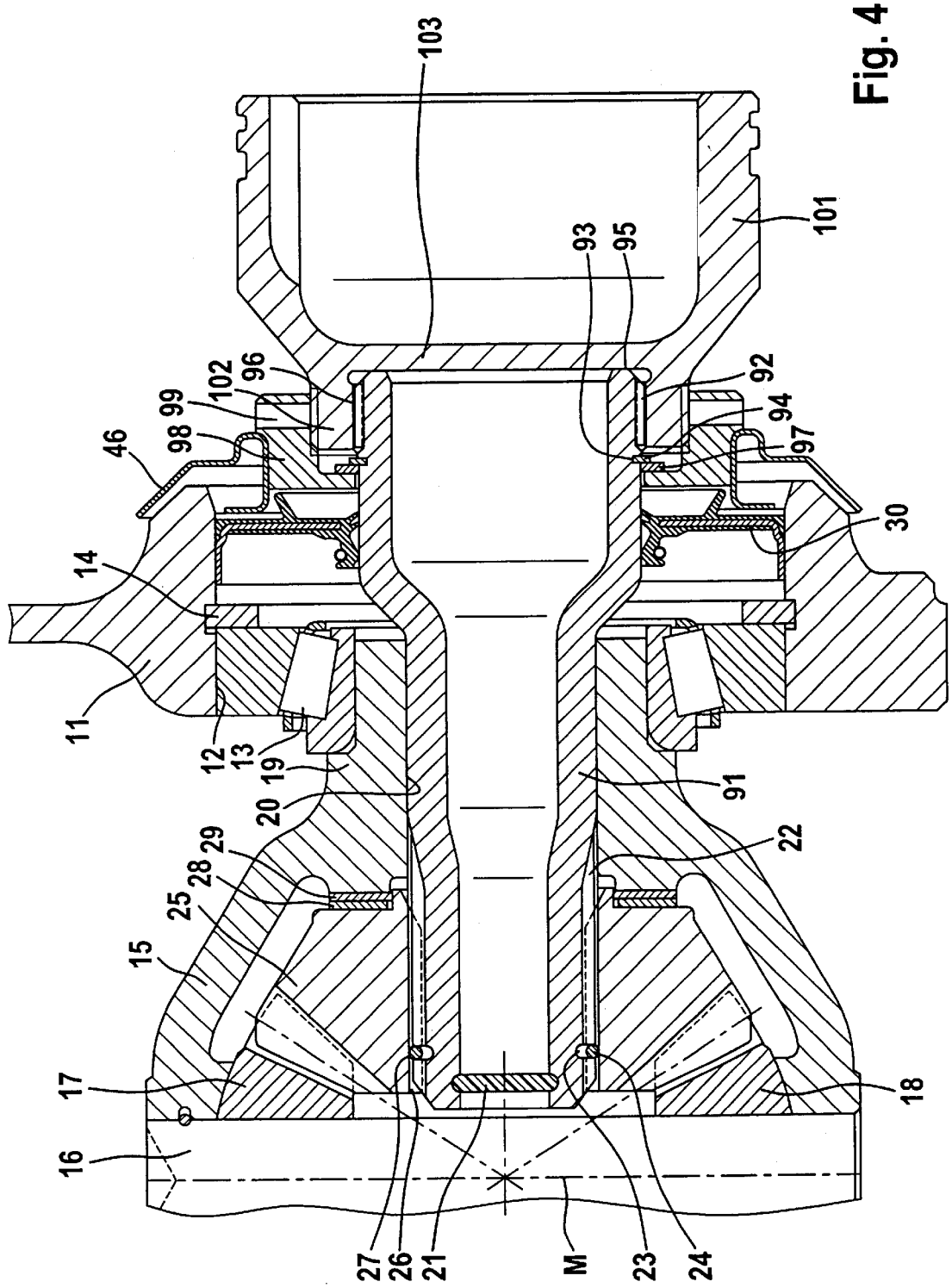
FIG. 4 shows half a section through a differential drive with a plugged-in inventive journal and a slipped-on inventive outer joint part in a fourth embodiment.

In FIG. 4, the side shaft journal 91 is provided in the form of a hollow shaft which, in two steps, changes from a portion with a larger diameter positioned outside the housing 11 to the portion with the smaller diameter inserted into the side shaft bevel gear 25. At the outer end, there is provided an outer shaft toothing 92 in front of which there is provided an annular groove 93 which is engaged by a securing ring 94. On to the outer end, there is slid an outer joint part 101 by means of a cylindrical projection 102 which comprises an inner shaft toothing 96. The securing ring 94 holds a disc 97 which supports a union nut 98 provided with bores for applying a hook-shaped key.

The union nut 98 extends over the cylindrical projection 102 and is threaded thereto. An end face 95 of the side shaft journal 91 is in abutment with a base part 103 of the outer joint part. The union nut connection can be released without applying any axial forces to the retaining ring connection between the side shaft journal 91 and the side shaft bevel gear 25. On the outside of the union nut 98, there is positioned a protective cover 46 for protecting the composite seal 30.

Figure 5:
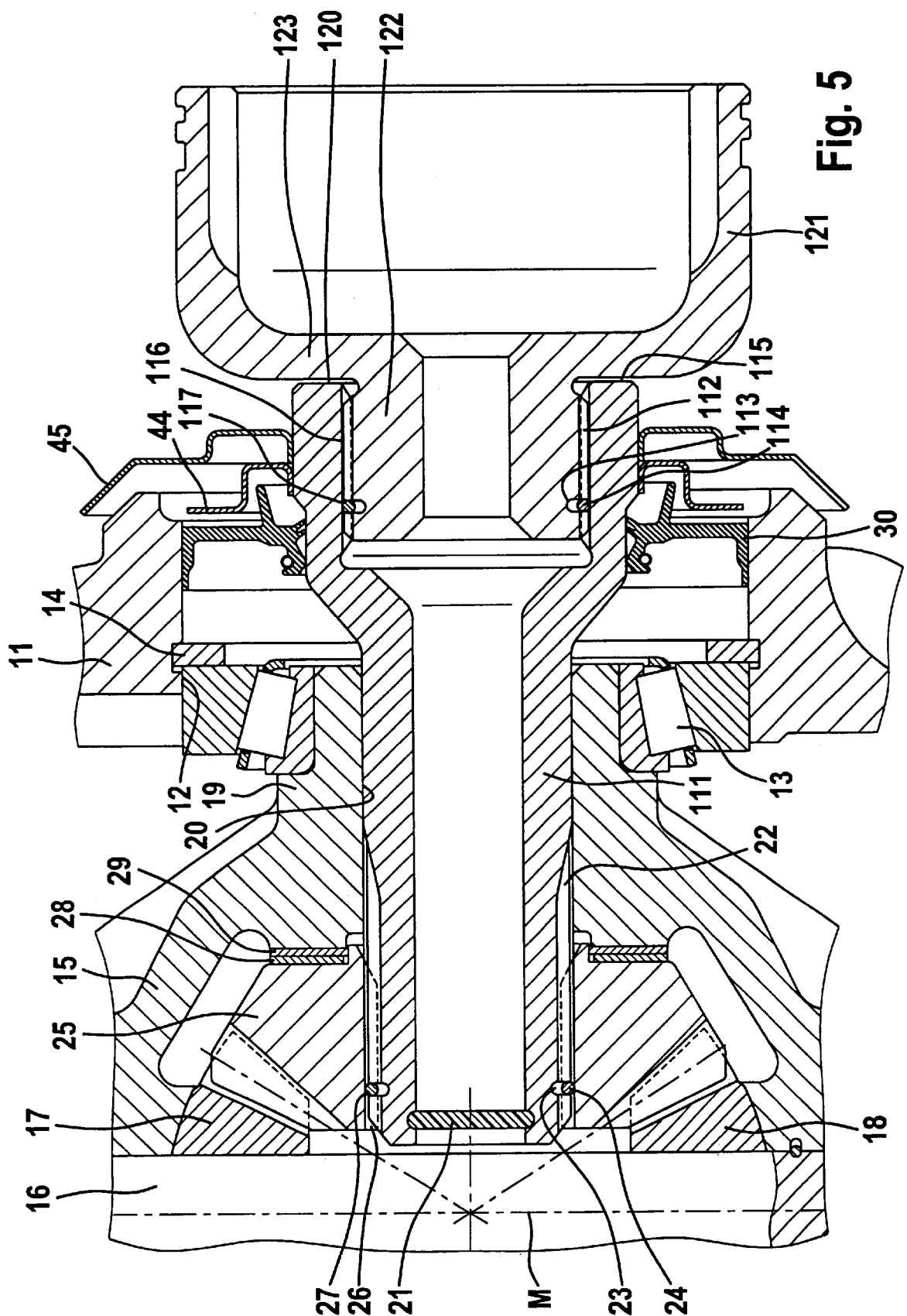
FIG. 5 shows half a section through a differential drive with a plugged-in inventive journal and a plugged-in inventive outer joint part.

In FIG. 5, the side shaft journal 111 is provided in the form of a hollow shaft which, in one step, changes from a portion with a greater diameter positioned outside the housing 11 to a portion with a smaller diameter inserted into the side shaft bevel gear 25. At the outer end, there is provided an inner shaft toothing 112 comprising an annular groove 113 which is engaged by a retaining ring 114. Into the outer end, there is slid the outer joint part 121 by means of a cylindrical projection 122 comprising an outer shaft toothing 116 which is also provided with an annular groove 117. The latter is also engaged by the retaining ring 114 and thus axially secures the outer joint part 121 relative to the side shaft journal 111 in both directions.

For the purpose of releasing the connection, a wedge-shaped tool can be slid into the annular gap 120 between a base part 123 of the outer joint part 121 and an end face 115 of the side shaft journal 111. In this way, the retaining ring connection can be released without applying any axial forces to the retaining ring connection between the side shaft journal 111 and the side shaft bevel gear 25. On the outside of the side shaft journal 111 there are positioned two protective covers 44, 45 for protecting the composite seal 30.

In all embodiments, the side shaft journal in the form of a hollow shaft, inside, in the region of its side shaft bevel gear 25, is sealed by a cover 21 made of plastics. As a result, the connection between the outer joint part 41, 61, . . . and the side shaft journal 31, 51 can be separated without any oil being able to emerge, i.e. in particular, without having to empty the drive, and vice versa, the CV-jointed shafts can be mounted with the differential drive already fitted in the vehicle and completely filled with oil.

What is claimed is:

1. An assembly comprising a side shaft journal for a differential drive and a joint component of a CV-jointed shaft which joint component is connected to the shaft journal, with the shaft journal comprising an inner end inserted into the differential drive and having outer shaft toothing and an annular groove for receiving a securing ring, by means of which the inner end is releasably connected to a side shaft gear of the differential drive, and further comprising an outer end which is connected to the joint component and provided with shaft toothing and formations for receiving nondestructively releasable axial securing means for the joint component, with the shaft journal being provided in the form of a hollow shaft.

2. An assembly according to claim 1, wherein the shaft toothing at the outer end is provided in the form of outer shaft toothing.

3. An assembly according to claims 1 or 2, wherein the formations comprise an annular groove having a conical cross section for receiving conically tapered pins.

4. An assembly according to claims 1 or 2, wherein the formations comprise an annular groove in front of an end of the shaft toothing for receiving a securing ring for supporting a union nut.

5. An assembly according to claim 2, wherein the shaft journal is inserted into the joint component.

6. An assembly according to claim 5, wherein the axial securing means comprise annular grooves associated with one another, and a retaining ring inserted into same.

7. An assembly according to claim 6, wherein the joint component includes a bore leading to abutting radial stop faces between the shaft journal and the joint component.

8. An assembly according to claim 5 wherein the axial securing means comprise a union nut which is slid onto the shaft journal and which is axially supported on a securing ring secured on the shaft journal and which is threaded onto the joint component.

9. An assembly according to claim 1, wherein the shaft toothing at the outer end is provided in the form of inner shaft toothing.

10. An assembly according to claim 9, wherein the shaft journal is slid onto a portion of the joint component.

11. An assembly according to any one of claims 5 or 10, wherein the axial securing means comprise removable securing elements.

12. An assembly according to claim 5 or 10, wherein the joint component is an outer joint part of a constant velocity universal joint.

13. An assembly according to claim 12, wherein the outer joint part comprises a base to whose outside there is attached a cylindrical sleeve.

14. An assembly according to claim 12, wherein the outer joint part, overall, is a sleeve component into which there is inserted a cover part.

15. An assembly according to claim 5 or 10, wherein for the connection between the shaft journal and the side shaft gear, the axial securing means can be released without the use of axial forces.

16. An assembly according to claims 1, 2, or 9, wherein the formations comprise an annular groove in the region of the shaft toothing for receiving a retaining ring.

17. An assembly according to claims 1, 2, or 9, wherein the shaft journal comprises an approximately constant wall thickness along its length.

18. An assembly according to claims 1, 2, or 9, wherein the shaft journal comprises an approximately constant resistance moment along its length.

19. An assembly according to claims 1, 2, or 9, wherein at its inner end, the shaft journal is closed by a cover.

20. A differential drive with two attached CV-jointed shafts including at least one assembly according to claims 1, 2, or 9.

21. A method of producing an assembly according to claims 1, 2, or 9, wherein the shaft journal, is produced by round hammering or round kneading.

22. A method of producing an assembly according to claims 1, 2, or 9, wherein the shaft journal, is produced by stretching or drawing.

23. A method of producing an assembly according to claims 1, 2, or 9, wherein the shaft journal, starting from a circular blank, is produced by deep-drawing.

* * * * *